United States Patent [19]

Harrison et al.

[11] Patent Number: 5,490,389
[45] Date of Patent: Feb. 13, 1996

[54] COMBUSTOR HAVING ENHANCED WEAK EXTINCTION CHARACTERISTICS FOR A GAS TURBINE ENGINE

[75] Inventors: Andrew Harrison; Keith Park, both of Derby, England

[73] Assignee: Rolls-Royce plc, London, England

[21] Appl. No.: 415,747

[22] Filed: Apr. 3, 1995

Related U.S. Application Data

[63] Continuation of Ser. No. 150,088, filed as PCT/GB92/00667, Apr. 13, 1992, abandoned.

[30] Foreign Application Priority Data

Apr. 13, 1992 [GB] United Kingdom .................. 9112324

[51] Int. Cl.$^6$ ......................................................... F02C 1/00
[52] U.S. Cl. .................................................. 60/737; 60/756
[58] Field of Search ............................. 60/733, 737, 748, 60/750, 751, 752, 757

[56] References Cited

U.S. PATENT DOCUMENTS

| | | | |
|---|---|---|---|
| 3,851,462 | 12/1974 | Vranos | 60/39.37 |
| 4,122,670 | 10/1978 | Reider | 60/733 |
| 4,246,757 | 1/1981 | Heberling | 60/737 |
| 4,695,247 | 9/1987 | Enzaki et al. | 606/756 |
| 5,012,645 | 5/1991 | Reynolds . | |
| 5,094,082 | 3/1992 | Thompson et al. | 60/750 |

FOREIGN PATENT DOCUMENTS

| | | | |
|---|---|---|---|
| 1215443 | 4/1966 | Germany . | |
| 2407484 | 8/1975 | Germany | 60/748 |

*Primary Examiner*—Timothy S. Thorpe
*Attorney, Agent, or Firm*—Cushman Darby & Cushman

[57] ABSTRACT

A gas turbine engine combustor (16) is provided with an airspray fuel injector (24), the downstream end of which is coplanar with a heat shield (38) provided at the upstream end of the combustor (16). The fuel injector (24) injects a fuel and air mixture into the combustion chamber (16a) defined within the combustor (16) which is in the form of a cone having an angle greater than 130°. The combustor (16) has enhanced weak extinction characteristics.

6 Claims, 3 Drawing Sheets

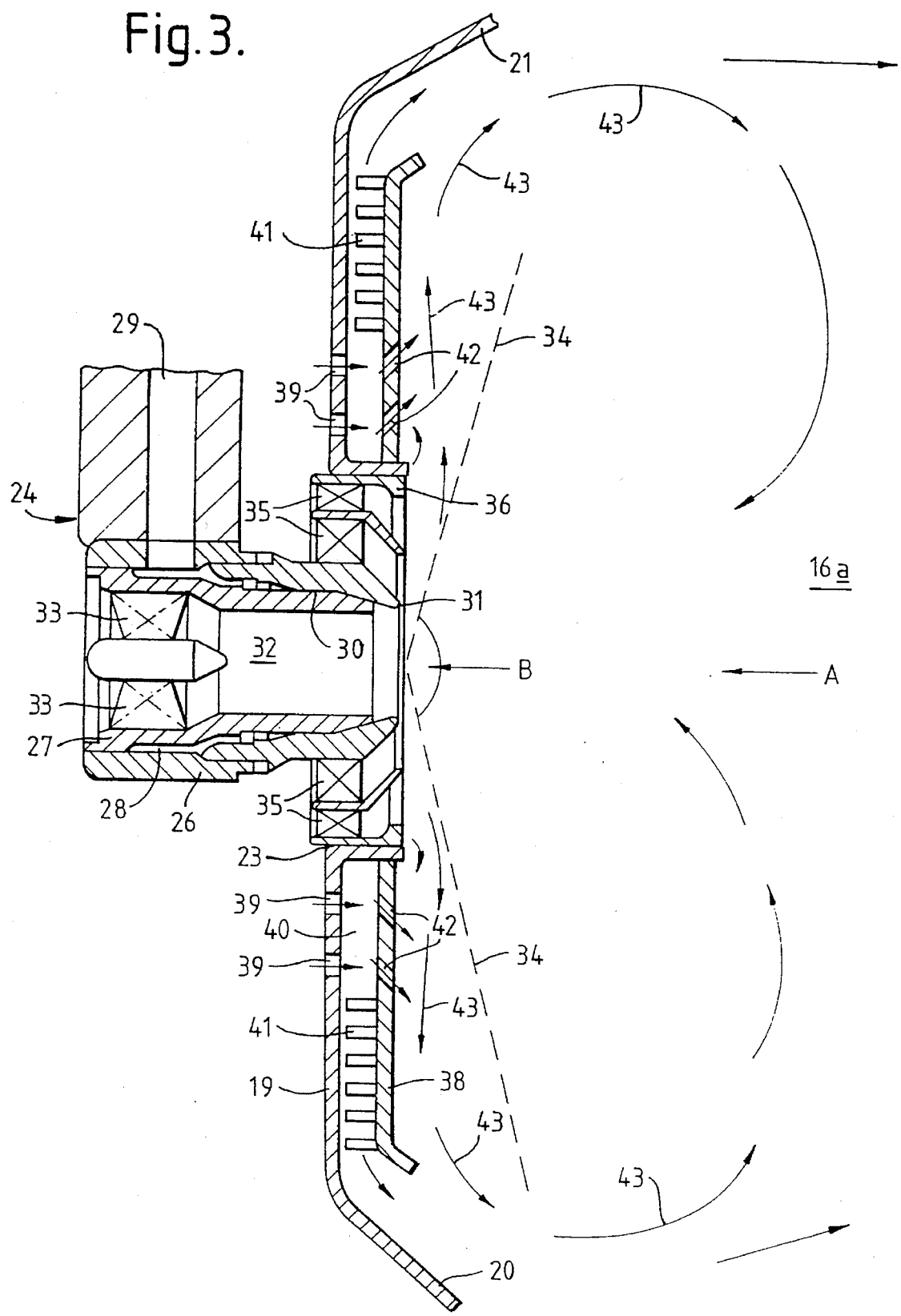

COMBUSTOR HAVING ENHANCED WEAK EXTINCTION CHARACTERISTICS FOR A GAS TURBINE ENGINE

This is a continuation of application Ser. No. 08/150,088, filed as PCT/GB92/00667, Apr. 13, 1992, which was abandoned upon the filing hereof.

This invention relates to a gas turbine engine combustor and in particular to a gas turbine engine combustor which has reduced missions of smoke and other pollutants.

In the gas turbine engine field there is a continuing trend towards reducing emissions of smoke and other pollutants. One way of achieving this is by increasing the airflow through the fuel injectors of the engine combustor. Unfortunately increasing the airflow has a detrimental effect on the weak extinction characteristics of the combustor. Thus it becomes increasingly difficult to ensure that under certain engine operating conditions, there is not an extinction of the combustion process taking place within the combustor.

It is an object of the present invention to provide a low emission gas turbine engine combustor having improved weak extinction characteristics.

According to the present invention, a gas turbine engine combustor comprises a combustion chamber having at its upstream end at least one fuel injector for injecting a mixture of fuel and air into said combustion chamber, said fuel injector being so configured that said fuel and air mixture is nominally injected into said combustion chamber in the general form of a hollow cone, the angle of said cone and the velocity of said injected fuel and air mixture being arranged to be such that together they result in the injected fuel and air mixture creating a low pressure zone adjacent the upstream wall of said combustion chamber, which thereby causes said injected fuel and air mixture to flow generally parallel with said wall.

The present invention will now be described, by way of example, with reference to the accompanying drawings in which FIG. 1 is a side-view in partially broken away form of a ducted fan gas turbine engine having a combustor in accordance with the present invention.

FIG. 3 is a view on an enlarged scale of part of the combustor portion shown in FIG. 2.

Figure 1:
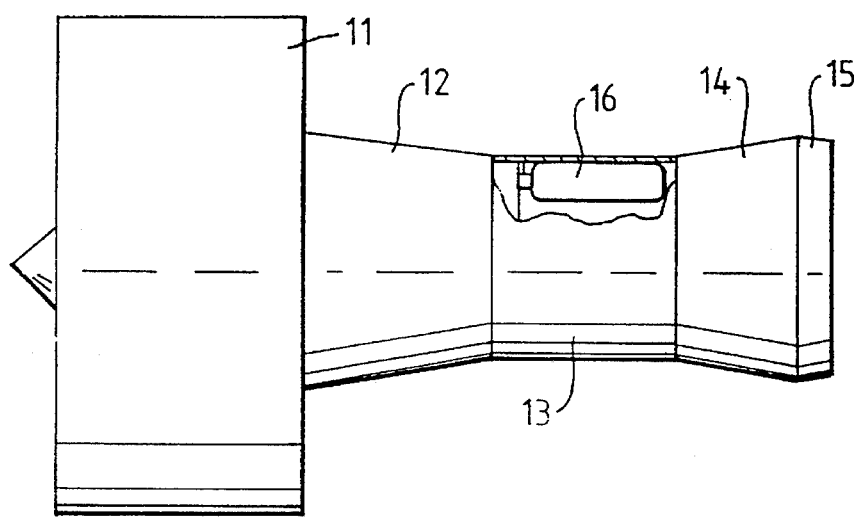

Referring to FIG. 1, a ducted fan gas turbine engine generally indicated at 10 is of conventional construction comprising, in axial flow series, a ducted fan 11, compressors 12, combustion equipment 13, turbines 14 and a propulsion nozzle 15. The engine 10 operates in the conventional way so air compressed by the fan 11 and compressors 12 is mixed with fuel and the mixture combusted in the combustion equipment 13. The resultant combustion products then expand through the turbines 14, which drive the fan 11 and compressors 12, to be exhausted through the propulsion nozzle 15. Propulsive thrust is provided by both the propulsion nozzle 15 exhaust and by part of the air flow exhausted from the fan 11.

Figure 2:
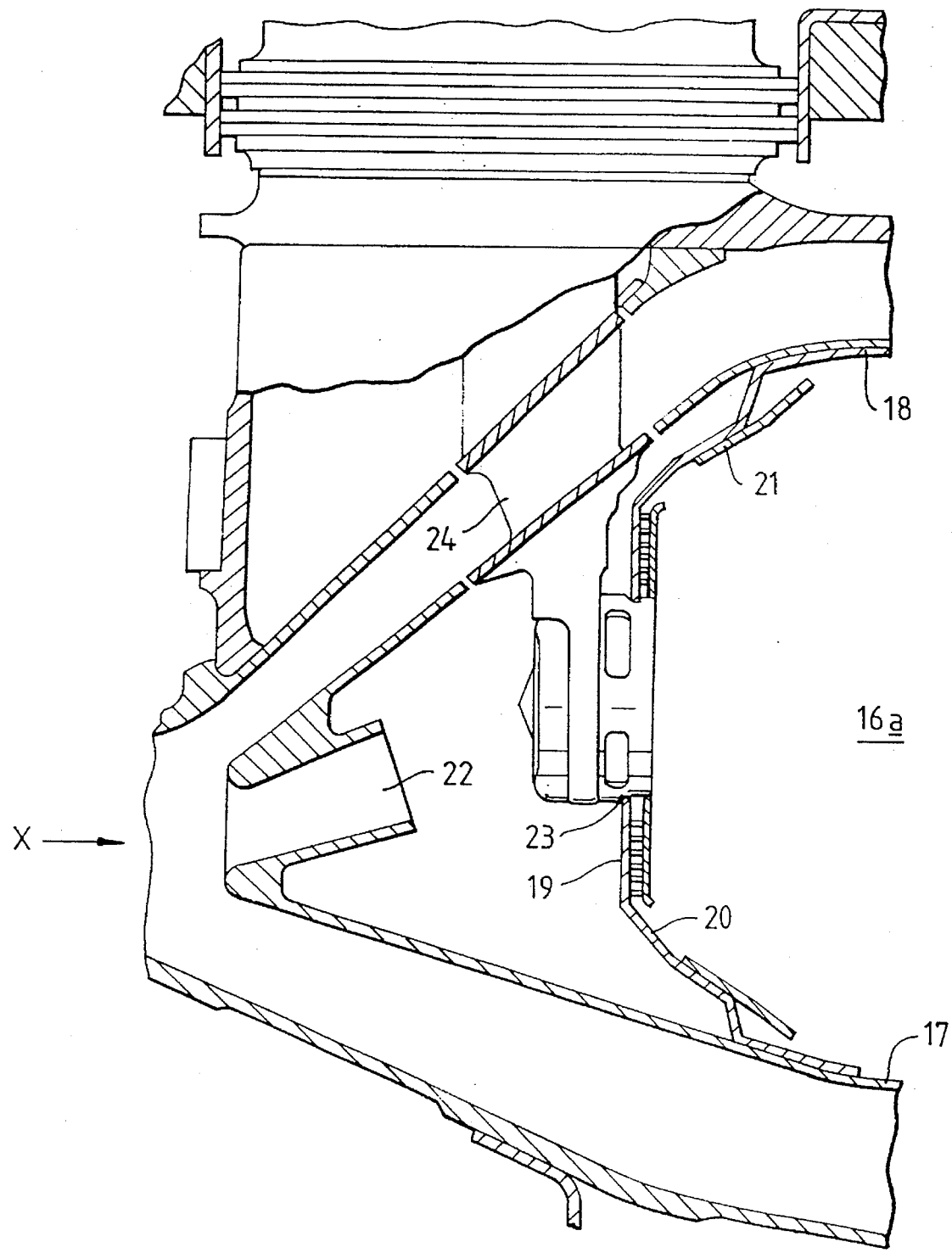
FIG. 2 is a sectioned side view of a portion of the upstream end of the combustor shown in FIG. 1.

The combustion equipment 13 comprises an annular combustor 16, the upstream end of which can be seen more clearly if reference is now made to FIG. 2. The combustor 16 comprises radially inner and outer annular walls 17 and 18 respectively which are interconnected at their upstream ends by a bulkhead 19, the mid-portion of which is generally planar and radially extending (with respect to the engine longitudinal axis). The radially inner and outer extents 20 and 21 respectively of the bulkhead 19 are configured to blend with the combustor walls 17 and 18. The combustor walls 17 and 18 extend upstream of the bulkhead 19 to define a plurality of air inlets 22. The air inlets 22 are fed with air from the compressors 12 flowing in the general direction indicated by the arrow X.

A plurality of apertures 23 are provided in the bulkhead 19, each one receiving the outlet end of an airspray fuel injector 24. The apertures 23 are equally spaced apart around the bulkhead 19.

Referring now to FIG. 3, each airspray fuel injector 24 comprises a generally cylindrical hollow body 26 within which is coaxially mounted a generally cylindrical hollow member 27. An annular chamber 28 is defined between the body 26 and the member 27. Fuel from a supply duct 29 within the fuel injector 24 is directed into the annular chamber 28. The fuel flows from the chamber 28 through a narrow annular gap 30 between the downstream regions of the body 26 and the member 27. The member 27 terminates slightly short of the downstream end 31 of the body 26 so the fuel continues to flow along the inner surface of the body 26.

Some of the air from the air inlet 22 flows into the passage 32 defined by the cylindrical hollow member 27. A plurality of radially extending turbine vanes 33 provided at the upstream end of the passage 32 serve to swirl the air flowing through the passage 32. The swirling air interacts with the fuel flowing along the inner surface of the body 26 so the fuel is exhausted from the downstream end 31 of the body 26 as a spray which is nominally in the form of a generally hollow cone as indicated by the interrupted lines 34. Additional turbine vanes 35 provided around the outer portion of the downstream end of the body 26 in two coaxial annular arrays ensure that air flowing over the exterior of the body 26 is also swirled as it passes into the combustor 16. It will be appreciated however that: under certain circumstances one annular array may suffice. The air exhausted from the turbine vanes 35 is swirled in the same direction as the fuel spray to reinforce the hollow conical form 34 of that spray. The rate of air flow through both the passage 32 and the turbine vanes 35 and the rate of fuel flow are arranged so that the air to fuel ratio in the combustion chamber 16a is fuel weak. This is typically an air to fuel ratio of 4.5:1 under full power conditions.

The radially outermost array of the annular turbine vane 35 arrays is surrounded by an annular member 36. The annular member 36 locates within and is supported by a flange 37 provided on the bulkhead aperture 23. The flange 37 extends in a downstream direction from the bulkhead 19 so the downstream end of the, fuel injector 24 protrudes slightly into the combustion chamber 16a. It will be appreciated that a floating seal arrangement could be used in place of the flange 37.

A heat shield 38 is located on the bulkhead 19. The heat shield 38 is apertured to receive the flange 37 and is maintained in spaced apart relationship with the bulkhead 19 by a plurality of studs (not shown). The downstream face of the heat shield 38 and the downstream ends of the flange 37 and the fuel injector 24 are arranged to be generally coplanar. The heat shields 38 and the radially inner and outer walls 17 and 18 respectively thereby define a combustion chamber 16a.

The bulkhead 19 is provided with a plurality of cooling air entry holes 39 adjacent the aperture 23. The holes 39 permit the flow of cooling air from the region upstream of the bulkhead 19 into the space 40 defined between the bulkhead 19 and the heat shield 38. Some of the air flows through the space 40 to be exhausted adjacent the bulkhead 19 radially inner and outer extents 17 and 18 respectively, thereby providing convective cooling of the heat shield 38. Pedestals 41 provided on the upstream face of the heat shield 38 enhance the heat exchange relationship between the cooling air and the heat shield 38.

The heat shield 38 itself is provided with a plurality of angled cooling holes 42 adjacent the fuel injector 24. The holes 42 are angled to direct some of the cooling air from the space 40 across the downstream surface of the heat shield 38 and away from the fuel injector 24. This cooling air flow provides film cooling of the heat shield 38. However it is important that this film of cooling air does not flow in such a direction to oppose the general direction of flow of the fuel and air mixture from the fuel injector 24.

Figure 4:
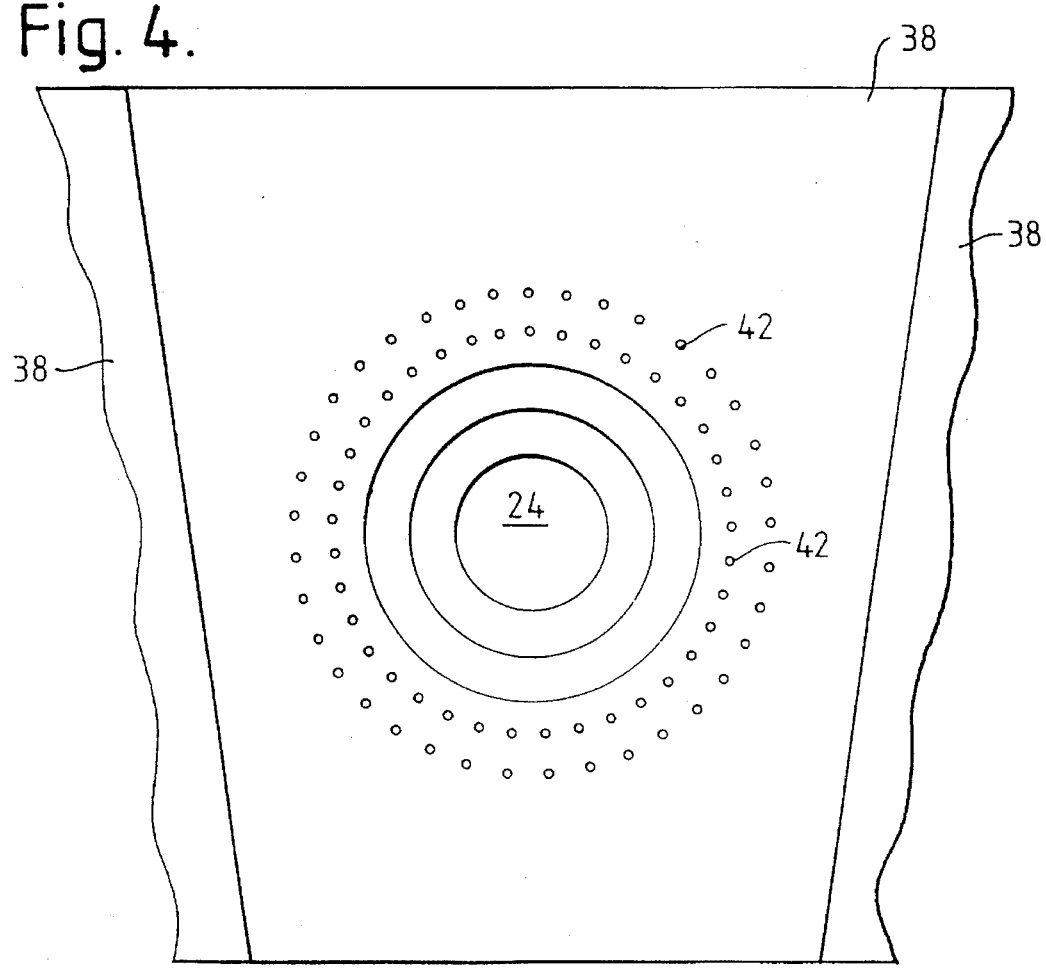
FIG. 4 is a view on arrow A of FIG. 3.

The heat shield 38 is one of a plurality of similar sector-shaped heat shields 38; one surrounding each of the fuel injectors 24 of the engine 10. The heat shields 38 abut or are closely spaced circumferentially so they cooperate to define an annular as can be seen in FIG. 4.

Each fuel injector 24 is so configured and the air flow through it is so arranged that the nominal hollow cone 34 of fuel produced thereby has an included angle B which is greater than 130°. As the fuel spray flows past the heat shield 38, it entrains air adjacent the heat shield 38. This results in a lowering of the air pressure adjacent the heat shield 38 and as a consequence the direction of the fuel spray changes so it flows in the general direction indicated by the arrows 43. In fact the fuel spray flows in a direction which is generally parallel with the heat shield 38. As the fuel spray reaches the radially inner and outer extents 17 and 18 of the bulkhead, it changes direction so some flows in a generally downstream direction while the remainder recirculates to flow back towards the fuel injector 24.

Although we have found that a cone angle of at least 130° is desirable, it may be found under certain circumstances that a cone angle of less than 130° may achieve the desired flow parallel with the heat shield 38 if the fuel spray velocity is sufficiently high.

We have found that this recirculation of some of the fuel spray directed from the fuel injector 24 improves the combustion process within the combustor 16 to the extent that its weak extinction characteristics are improved. Indeed tests have indicated that at a fuel to air ratio of 4.5:1 the weak extinction performance of the combustor 16 has proved to be acceptable. Fuel injectors which do not result in the fuel spray flowing generally parallel with the heat shield 38 were found to have an unacceptable weak extinction performance.

The angled cooling holes 42 in the heat shield ensure that the cooling air exhausted from them does not, as previously stated, oppose the flow of the fuel spray. Tests which we have carried out indicate that if the cooling air flow does oppose the fuel spray flow, the fuel spray does not flow generally parallel with the heat shield 38 and the weak extinction characteristics of the combustor 16 are detrimentally affected.

Although the present invention has been described with reference to a combustor 16 having heat shields 38, it will be appreciated that in certain circumstances, such heat shields 38 may not be necessary. In such an event, the downstream end of the fuel injector 24 would be arranged to be coplanar with the bulkhead 19, and the combustion chamber 16a would be defined by the bulkhead 19 and the radially inner and outer walls 17 and 18 respectively.

It will also be appreciated that although the present invention has been described with reference to a gas turbine engine provided with an annular combustor, it could also be applied to an engine provided with a plurality of individual combustor cans.

We claim:

1. A gas turbine engine combustor comprising a combustion chamber (16) having an upstream heat-shield (38) surface with plural holes (42) therein for directing cooling air therethrough for flow over the downstream heat-shield (38) surface and having at least one fuel injector (24) for injecting a mixture of fuel and air into said combustion chamber (16), said fuel injector (24) being so configured that said fuel and air mixture is nominally injected about an axis into said combustion chamber (16) in the general form of a hollow cone (34) defined about the axis, characterized in that the angle (B) of said cone (34) and the velocity of said injected fuel and air mixture are arranged to be such that together they result in the injected fuel and air mixture creating a low pressure zone adjacent the heat shield (38) surface to cause said injected fuel and air mixture to flow generally away from the axis and parallel with said heat-shield surface (38), the hole (42) directing cooling air intermediate the heat shield (38) surface and the low pressure zone and at an angle relative the heat shield surface (38) so that the cooling air flow does not oppose said flow of said fuel and air mixture, at least some of said fuel and air mixture changing direction to flow toward the axis to effect a flow recirculation zone immediately downstream of the heat shield (38) surface.

2. A gas turbine engine combustor as claimed in claim 1 characterized in that the angle of said cone (34) is greater than 130°.

3. A gas turbine engine combustor as claimed in claim 1 or 2 characterized in that the downstream end of said fuel injector (24) is generally coplanar with the plane of the heat shield (38) surface of said combustion chamber (16).

4. A gas turbine engine combustor as claimed in claim 1 characterised in that the upstream end of said combustion chamber (16) is constituted by a bulkhead (19), the or each of said heatshields (38) being disposed downstream of said bulkhead (19) so as to be in spaced apart relationship therewith, means (39) being provided to direct cooling air into the space (40) defined between said bulkhead (19) and said the or each heatshield (38) so as to provide cooling of said the or each heatshield (38).

5. A gas turbine engine combustor as claimed in claim 4 characterized in that a plurality of holes (39) are provided in said bulkhead (19) to direct cooling air into said space (40) defined between said bulkhead (19) and said heat shield (38).

6. A gas turbine engine combustor as claimed in claim wherein said at least one fuel injector (24) is provided with a plurality of turning vanes (35) to swirl the mixture of fuel and air injected thereby.

* * * * *